United States Patent Office 2,926,882
Patented Mar. 1, 1960

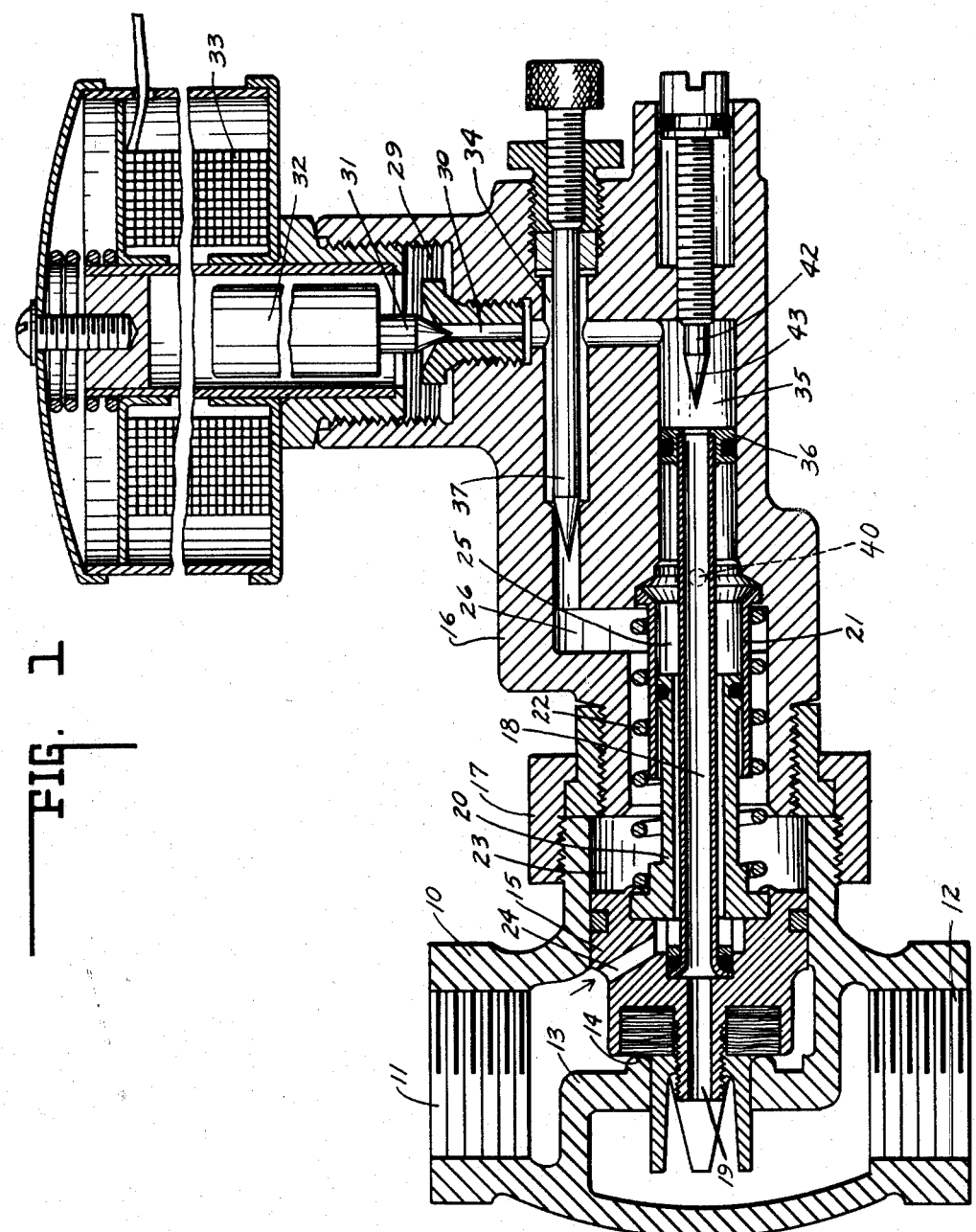

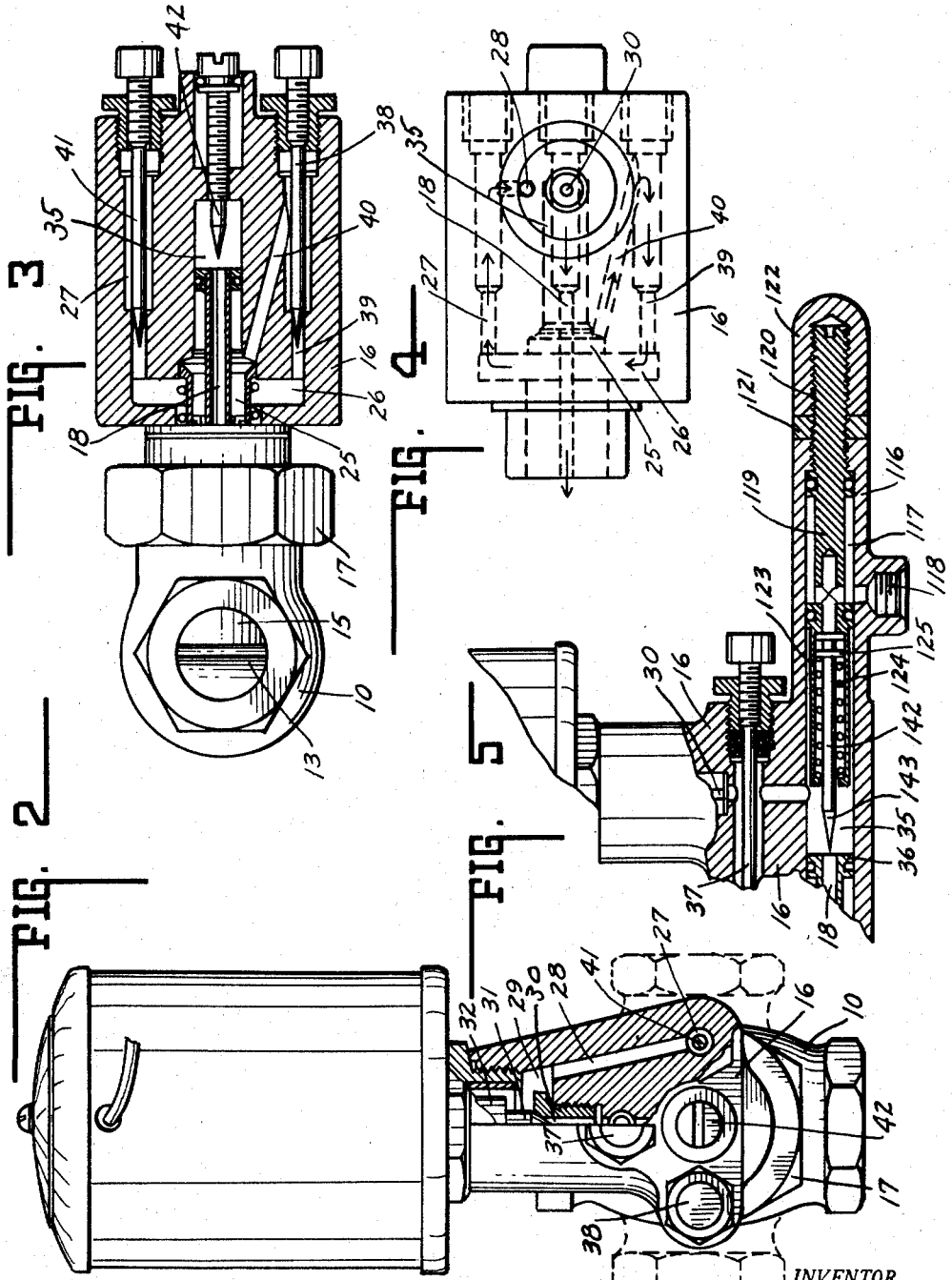

2,926,882

HYDRAULIC CONTROL VALVE

William M. Russell, Indianapolis, Ind., assignor to J. D. Gould Company, Indianapolis, Ind., a copartnership Application July 6, 1956, Serial No. 596,324

11 Claims. (Cl. 251—30)

This invention relates to a hydraulic control valve for controlling fluid flow in a hydraulic circuit. Whereas said valve is particularly applicable to the control of ram type elevators and may be electrically actuated as by a solenoid, it is useful in other applications wherever it is desired to control fluid flow.

Wherein the valve of this invention may be applied to a hydraulic elevator, various factors are desirable, both as controlling the speed of movement of the elevator irrespective of its load, the speed of starting and the speed of stopping. Thus, the hydraulic system may be designed for a speed of operation above the specified speed and then throttled down to the specified speed, including means to compensate for varying loads. The starting speed may be adjusted without sacrificing the stopping speed through independent adjustment, whereas heretofore the controls of the starting and stopping speeds were so inter-related that the adjustment of he one affected the adjustment of the other.

With the above improvements in mind, one feature of the invention resides in the provision of separately and independently adjustable metering devices for regulating the opening and closing speeds separately and independently of each other. Thus, the closing speed may be adjusted as desired by one setting of the metering device which regulates the fluid flow into the valve controlling pressure chamber in a manner to establish the amount of time for the piston valve to return from its open position to its closed position. After such adjustment of the closing speed metering device, and without affecting its operation and the speed of closing, the opening speed metering device may be independently adjusted as desired to regulate the flow of fluid from the pressure chamber when the pilot valve, such as a solenoid valve, is opened to thereby establish the time required to bleed the pressure chamber and permit the piston valve to move to its open position.

Another feature of the invention resides in the control valve provided in the fluid flow circuit being mounted with respect to the control mechanism so as to swivel thereon to any angular position for convenience in connecting it into any position of the hydraulic circuit, whether horizontal, vertical or at any angle.

A further feature of the invention resides in the control of the operating speed of an adjustable setting for the full open position of the hydraulic control valve, and which will compensate for variations in load. Thus, a specified speed of movement may be obtained by over-rating the hydraulic system to a greater than specified speed and then effecting an adjustment of the speed control device to reduce the speed to that specified.

Additionally, by means of this feature of the invention the specified speed will be maintained regardless of load. This is accomplished by providing an adjustable tapered balancing plug pressure actuated from the circuit on the intake side of the valve body for automatically controlling the opening movement of the piston valve to maintain a balance of fluid pressure such as to compensate for variations in load, as will be hereinafter more fully set forth and described.

Further features of the invention will be hereinafter more particularly set forth and described.

The full nature of the invention will be understood from the accompanying drawings and the following description and claims:

Fig. 1 is a central vertical section through the hydraulic control valve of this invention.

Fig. 2 is a rear elevation thereof, showing in dotted lines the valve swivelled from vertical to horizontal position, with a portion thereof broken away and shown in section.

Fig. 3 is a horizontal section of the valve control casing.

Fig. 4 is a top plan view of the casing with the control device removed, showing the fluid passageways in dotted lines.

Fig. 5 is a portion of the control casing with a modified form of speed control balancing plug for remote control.

In the drawings there is shown by way of illustrating one embodiment of the invention a valve body 10 for connecting into a fluid flow circuit, and having an intake 11 and fluid outlet 12. Said valve body is provided with the usual bridge 13 separating the intake from the outlet, other than through the opening formed by the valve seat 14 which is controlled by a piston valve 15. The valve body is swivelly coupled to the control casing 16 by a collar or bonnet 17 of the union type. Secured to the piston valve there is a tubular extension 18 communicating with a passage 19 in the piston valve, which provides a flow control passage open to the outlet side of the valve body 10 and movable with the piston valve. Also, secured to the piston valve, and movable therewith, there is a sleeve extension 20 surrounding the tube 18 in spaced relation thereto with its free end slidable in sealing relation with a barrel 21 secured to the control casing 16. Said barrel is provided with a shoulder against which one end of the balancing spring 22 abuts, the other end of said spring abutting against the piston valve.

The junction between the valve body 10 and the control casing 16 provides a space to the rear of the piston valve in the nature of a fluid pressure chamber 23. Said piston valve is provided with a conduit 24 leading from the inlet side of the valve body to the space between the tube 18 and the sleeve 20, then to chamber 25 through passage 40 (Fig. 3) past metering pin 38 into passage 39, compartment 26, through the space surrounding barrel 21, and into pressure chamber 23.

In the above arrangement with pilot valve 31 closed, the fluid pressure on the intake side of the flow circuit extends into the pressure chamber 23 and control compartment 26 as well as the chamber 25. The pressure exerted thereby acts against the rear face of the piston valve, tending to close it aided by the balancing spring 22. Since the rear side of the piston valve is of a greater area than the forward or seating side thereof, the valve will be maintained in its closed position so long as such a balancing fluid pressure remains in the pressure chamber. As fluid is bled from the pressure chamber to relieve the fluid pressure opposing the opening of the valve, the pressure in the intake side of the body 10 of the valve will move it to open position against the tension of the balancing spring.

For bleeding off the fluid from the pressure chamber, a port 27 (Figs. 2 and 3) communicates with the control compartment 26 which in turn is in communication with the pressure chamber. This port leads to a passage 28 communicating with a pilot valve chamber 29 which is in communication with a passage 30 controlled by the solenoid actuated pilot valve 31. This valve is of the usual character carried by a core 32 magnetically actuated upon the coil 33 being energized to move said valve to open position and permit fluid to pass from the chamber 29 through the passage 30. The passage 30 (Fig. 1) bisects a passage 34 and enters the cylinder 35 in which the head 36 on the rear end of tube 18 provides a free passage to the outlet side of the valve body. Thus, when the solenoid is energized it will open the pilot valve 31, freeing the passage from the pressure chamber 23, thus reducing the pressure therein to permit the piston valve 15 to open under pressure on the intake side of the valve body 10.

To provide means for manually relieving pressure in the pressure chamber to permit the piston valve to open in event of failure of the solenoid pilot valve, there is a manually operated pilot valve 37 (Fig. 1) which frees the passage 34, which, upon being manually opened, will have the same effect as the opening of the solenoid pilot valve.

The closing speed of the piston valve, which in turn affects the stopping speed of an elevator or the like, is controlled by adjustment of the closing speed metering device or pin 38 which controls a by-pass port 39 to permit fluid to flow at a regulated rate from the chamber 25 through a passage 40 back to the compartment 26 and pressure chamber 23. Thus, upon the pilot valve being closed so that fluid can no longer pass therethrough from the pressure chamber to the outlet side of the valve body, the piston valve being open, the pressure of fluid on the intake side of the valve body will flow into chamber 25 and past the metering pin 38 back to the pressure chamber to gradually, as controlled by the metering pin, build up sufficient pressure in the pressure chamber 23 to force the piston valve to its closed position with the aid of the balancing spring 22. The rate of build-up of pressure in said pressure chamber may be controlled by the adjustment of said metering pin to correspondingly gradually close the piston valve.

After the closing metering pin 38 has been adjusted the opening speed metering pin 41 may be adjusted to similarly control the opening of the piston valve so that there will be a gradual opening thereof upon the pilot valve 31 being opened, according to the setting of the metering pin 41 in the port 27 (Fig. 3). Thus, fluid is permitted to escape from the pressure chamber 23 through the control compartment 26, port 27 into the pilot valve chamber 29 and thence through passage 30, cylinder 35 and tube 18 to the outlet side of the valve body. Thus, the metering of the above-described fluid passage controls the rate of dissipation of fluid pressure in the pressure chamber 23, such as to permit the gradual retraction and opening of the piston valve.

It being desired to limit and balance the open position of the piston valve to attain a specified rate of flow through the valve body, there is provided a flow control device in the form of a balancing plug 42. Said plug is formed with a tapered end 43 extending into the cylinder 35 in alignment with the fluid bleed tube 18 and its opening through its head 36. The tapered end of said plug is set in a relative position to said tube when the piston valve is closed so that as said valve retracts upon opening, the head 36 of said tube will telescope over the tapered end of the plug. This has the dual effect of limiting the fluid flow through the valve housing, and providing a balancing of the differential pressure on the valve. If the valve were permitted to open to an extreme position wherein the plug would completely close the passage through the tube 18, the escape of fluid from the pressure chamber through the open pilot valve 31 would be cut off just as effectively as though the pilot valve were closed. This would have a tendency to cause the valve to gradually move to its closing position by the pressure building up in the pressure chamber through the closing metering pin 38.

However, there will be sufficient pressure develop in cylinder 35 acting against the head 36 of the tube 18 to prevent complete closing of the passage therethrough. As the passage therethrough becomes reduced, however, by the tapered end 43 of the plug being gradually telescoped by the tube, relief of pressure in the pressure chamber will be maintained at a constant balance. With the pressure in the cylinder 35 the head 36 will not completely close and therefore the adjusted position of this tapered plug maintains a limited flow control opening of the piston valve.

In Fig. 5 there is shown a modified form of flow control device which is pressure-actuated to automatically maintain a constant flow regardless of the load on the hydraulic circuit. In this, the control casing 16 is provided with an extension 116 in alignment with the tube 18 and chamber 35. This extension 116 provides a cylinder 117 having an intake 118 which is connected to the hydraulic circuit on the inlet side of the valve 10. Adjustably mounted in the cylinder there is a control stem 119 threaded at one end as indicated at 120 for screw adjustment toward and away from the tube 18 and adapted to be locked in adjusted position by the lock nuts 121, 122. The other end of said stem terminates in an elongated cylinder portion 123 which carries the flow control balancing plug 142 having a tapered end 143.

Said plug and its tapered end function as above described in respect to the corresponding manually adjustable balancing plug 42. Said plug 142 is surrounded by a compression spring 124 bearing against a piston head 125 operating in said cylinder. Thus, the spring 124 biases the plug to its retracted position which is its normal setting by manual adjustment. Through the hydraulic circuit ahead of the valve 10, fluid may be forced under pressure, varying according to the load on the circuit, through the intake 118 into the chamber of the cylinder 117 to exert varying fluid pressure against the head 125 of the plug 142. Such variable pressure tends to position the plug against tension of spring 124 further toward the tube 18.

In such forward position the bleeding of the fluid through said tube will be more or less restricted and thereby vary the extent of opening of the piston valve. Any variation in the load on the intake side of the valve 10 will be compensated for by such varying of the piston valve opening as may be automatically controlled by the fluid pressure in the cylinder 117, thereby maintaining constant flow through the valve 10 irrespective of fluid load in the circuit. Thus, as applied to a ram type elevator, a predetermined speed will be maintained regardless of the elevator load.

In operation, and in recapitulation of the above, with the pilot valve 31 closed the piston valve will be closed and flow through the valve body shut off. However, a pressure will be built up in the pressure chamber 23 so that upon opening the pilot valve, either electrically or manually, the fluid will be bled off to the outlet side of the valve body through the tube 18. The fluid pressure in the pressure chamber is thereby reduced to permit the pressure on the intake side to open the valve. The valve will open just so far as permitted by the balancing plug 42, 142, according to its setting.

At a prescribed setting of the plug, its tapered end will cause the differential pressure on the piston valve to so position it as to permit a predetermined rate of flow through the valve body. Balancing of the pressure on both sides of the piston valve at this setting may thereby be maintained regardless of any variation in load. Thus, upon an increase in load a back pressure will be developed, tending to further open the valve, but a compensating pressure will develop in the pressure chamber due to the further restriction in the bleeding therefrom caused by the tapered end of the plug 42. A predetermined speed of flow through the valve body will thereby be maintained. By such controlled balancing of the hydraulic circuit through the valve, the speed of opening and closing will be greater without undue shock to the system.

To control the speed of closing of the valve the metering pin 38 is adjusted to restrict the fluid flow from the chamber 25 back to the pressure chamber through the compartment 26, thereby more or less gradually building up the pressure in said pressure chamber, tending to move the piston valve to its closing position. This, of course, occurs only after the pilot valve is closed so that fluid will not continue to be bled from the pressure chamber. The greater the restriction in the by-pass port 39 by the metering pin 38, the slower the pressure will build up and the slower the closing action of the valve so as to bring an elevator or the like to a gradual stop. The less restriction by said pin permits a greater speed of build-up pressure and closing of the valve.

After the metering pin 38 has been adjusted to obtain the desired rate of closing and speed of stopping of an elevator or the like, then the opening metering pin 41 may be independently adjusted to regulate the opening speed, such as to give an elevator or the like a faster or slower start. This pin, of course, controls the rate of bleed-off of the fluid pressure from the pressure chamber 23 to the discharge side of the valve body and through the pilot valve and tube 18. The more restricted the passage past the metering pin the slower the opening of the piston valve and pick-up in flow of fluid through the circuit. Similarly with the metering pin adjusted to a more widely open position, the bleed-off in the pressure chamber will be much faster, permitting the faster opening of the piston valve with a corresponding increase in the starting speed of an elevator or the like.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A fluid control valve for a fluid pressure line including a body portion having an inlet and outlet separated by a bridge portion having an opening surrounded by a valve seat, a cylinder extending from said valve seat in concentric relation thereto, a piston valve reciprocable in said cylinder having a working face engageable with said valve seat, a tubular extension in sealing engagement with the walls of an extension of said cylinder and carried by said piston valve, said cylinder providing a pressure chamber on the side of said piston valve opposite its working face, a fluid conduit connecting the inlet side of said body portion with said chamber for developing fluid pressure therein biasing said piston valve toward seat-engaging position, a passageway connecting said chamber with the outlet side of said valve body and passing through said extension, a pilot valve movable to open and close said passageway to bleed said chamber of fluid pressure through said extension when in open position for permitting the fluid pressure on the intake side of said valve body to open said piston valve, a balancing plug adjustably positioned relative to the free end of said extension to control the flow therethrough in inverse proportion to the degree of opening of said piston valve thereby determining the volume of flow past said valve seat when said piston valve is in full open position, and a metering device in said passageway for varying the rate of flow therethrough to thereby control the opening speed of said piston valve.

2. A fluid control valve for a fluid pressure line including a body portion having an inlet and outlet separated by a bridge portion surrounded by a valve seat, a cylinder extending from said seat in concentric relation thereto, a piston valve reciprocable in said cylinder having a working face engageable with said seat, said cylinder providing a pressure chamber on the side of said piston valve opposite its working face, a fluid conduit extending through said valve from the inlet side of said body portion to said chamber for developing fluid pressure therein biasing said valve toward seat-engaging position, a passageway connecting said chamber with the outlet side of said valve body, a portion thereof being formed in said valve, a manually adjustable metering pin in said passageway, a solenoid-actuated pilot valve movable to open and close said passageway for bleeding said chamber of fluid pressure when in open position to permit the differential pressure increase on the intake side of said valve to move it to open position, and a flow balancing plug positioned relative to the movable portion of said passageway to control the rate of flow therethrough in inverse proportion to the degree of opening of said piston valve thereby determining the volume of flow past said valve seat when said piston valve is in full open position.

3. A fluid control valve for a fluid pressure line including a body portion having an inlet and outlet separated by a bridge portion surrounded by a valve seat, a cylinder extending from said seat in concentric relation thereto, a piston valve reciprocable in said cylinder having a working face engageable with said seat and a piston portion responsive to the inlet pressure to open said piston valve, a tubular extension in sealing engagement with the walls of an extension of said cylinder and carried by said piston valve, said cylinder providing a pressure chamber on the side of said piston valve opposite its working face, a fluid conduit extending through said valve from the inlet side of said body portion to said chamber for developing fluid pressure therein biasing said valve toward seat-engaging position, a passageway connecting said chamber with the outlet side of said valve body through said extension, a solenoid-actuated pilot valve movable to open and close said passageway for bleeding said chamber of fluid pressure through said extension when in open position to permit the differential pressure increase on the intake side of said valve to move it to open position, an auxiliary manually operable pilot valve for opening a bypass from said pressure chamber to said passageway upon said solenoid-actuated pilot valve being inoperable in its closed position, a balancing plug adjustably positioned relative to the free end of said extension to control the flow therethrough, and a manually adjustable metering device in said passageway for varying the rate of flow therethrough to thereby control the opening speed of said piston valve.

4. A fluid control valve for a fluid pressure line including a body portion having an inlet and outlet separated by a bridge portion having an opening surrounded by a valve seat, a cylinder extending from said valve seat in concentric relation thereto, a piston valve reciprocable in said cylinder having a working face engageable with said valve seat and having a piston portion responsive to the inlet pressure to open said piston valve, said cylinder providing a pressure chamber on the side of said piston valve opposite its working face, a fluid conduit connecting the inlet side of said body portion with said chamber for developing fluid pressure therein biasing said piston valve toward seat-engaging position, a passageway connecting said chamber with the outlet side of said valve body, a pilot valve movable to open and close said passageway to bleed said chamber of fluid pressure when in open position for permitting the fluid pressure on the intake side of said valve body to open said piston valve, a metering device in said passageway ahead of said pilot valve for varying the rate of flow therethrough to thereby govern the opening speed of said piston valve, and a second metering device in said fluid conduit adjustable independently of said first metering device for controlling the rate of pressure build-up in said chamber when said pilot valve is closed thereby governing the closing speed of said valve.

5. A fluid control valve for a fluid pressure line including a body portion having an inlet and outlet separated by a bridge portion having an opening surrounded by a valve seat, a cylinder extending from said valve seat in concentric relation thereto, a piston valve reciprocable in said cylinder having a working face engageable with said valve seat and a piston portion responsive to the inlet pressure to open said piston valve, said cylinder providing a pressure chamber on the side of said piston valve opposite its working face, a fluid conduit connecting the inlet side of said body portion with said chamber for developing fluid pressure therein biasing said piston valve toward seat-engaging position, a passageway connecting said chamber with the outlet side of said valve body, a pilot valve movable to open and close said passageway to bleed said chamber of fluid pressure when in open position for permitting the fluid pressure on the intake side of said valve body to open said piston valve, a metering device in said passageway adjustable for varying the rate of flow therethrough to thereby govern the opening speed of said piston valve, a second metering device in said fluid conduit adjustable independently of said first device for controlling the rate of pressure build-up in said chamber when said pilot valve is closed thereby governing the closing speed of said valve, and a flow control device comprising a balancing plug adjustably mounted in said passageway having means cooperating therewith to restrict the flow of fluid from said chamber upon said piston valve moving to a predetermined open position to thereby control the rate of flow therethrough.

6. A fluid control valve for a fluid pressure line including a body portion having an inlet and outlet separated by a bridge portion surrounded by a valve seat, a cylinder extending from said seat in concentric relation thereto, a piston valve reciprocable in said cylinder having a working face engageable with said seat and a piston portion responsive to the inlet pressure to open said piston valve, said cylinder providing a pressure chamber on the side of said piston valve opposite its working face, a fluid conduit extending from the inlet side of said valve to said chamber for developing fluid pressure therein biasing said valve toward seat-engaging position, a passageway connecting said chamber with the outlet side of said valve body, a portion thereof passing through said valve and movable therewith, a solenoid-actuated pilot valve movable to open and close said passageway for bleeding said chamber of fluid pressure when in open position to permit the differential pressure increase on the intake side of said valve to move it to open position, and a flow control device comprising a balancing plug manually adjustable and having a beveled end positioned for partial telescoping with the movable portion of said passageway to restrict the rate of bleed-off from said chamber upon said valve moving to a predetermined open position to thereby control the rate of flow therethrough in inverse proportion to the degree of opening of said piston valve thereby determining the volume of flow past said valve seat when said piston valve is in full open position.

7. A fluid control valve for a fluid pressure line having an inlet and outlet separated by a bridge portion provided with an opening therein surrounded by a valve seat, a cylinder extending axially and concentrically of said valve seat, a piston valve reciprocable in said cylinder and having a working face movable into and out of closing engagement with said seat and a piston portion responsive to the inlet pressure to open said piston valve, said cylinder providing a pressure chamber on the side of said piston valve opposite its working face, a fluid conduit connecting the inlet side of said valve body with said chamber to develop a fluid pressure therein biasing said piston valve to closed position, a tubular extension in sealing engagement with the walls of an extension of said cylinder and carried by said piston valve, communicating with the outlet side of said valve body, a passageway connecting said chamber with the extended end of said tubular extension, a pilot valve for opening said passageway to bleed fluid pressure from said chamber through said tubular extension to the outlet side of said valve body for permitting said valve to move to open position, and a flow control device comprising a balancing plug adjustably mounted in said passageway to obstruct said tubular extension for limiting the opening movement of said piston valve.

8. A fluid control valve for a fluid pressure line having an inlet and outlet separated by a bridge portion provided with an opening therein surrounded by a valve seat, a cylinder extending axially and concentrically of said valve seat, a piston valve reciprocable in said cylinder and having a working face movable into and out of closing engagement with said seat and a piston portion responsive to the inlet pressure to open said piston valve, said cylinder providing a pressure chamber on the side of said piston valve opposite its working face, a fluid conduit connecting the inlet side of said valve body with said chamber to develop a fluid pressure therein biasing said piston valve to closed position, a tubular extension in sealing engagement with the walls of an extension of said cylinder and carried by said piston valve, said tubular extension communicating with the outlet side of said valve body, a passageway connecting said chamber with the extended end of said tubular extension, a pilot valve for opening said passageway to bleed fluid pressure from said chamber through said tubular extension to the outlet side of said valve body for permitting said valve to move to open position, and a flow control device comprising a balancing plug adjustably mounted in said passageway having a beveled end positioned for partial telescoping by said extension to restrict the rate of bleed-off from said chamber upon said valve moving to a predetermined open position to thereby control the rate of flow therethrough.

9. A fluid control valve for a fluid pressure line having an inlet and outlet separated by a bridge portion provided with an opening therein surrounded by a valve seat, a cylinder extending axially and concentrically of said valve seat, a piston valve reciprocable in said cylinder and having a working face movable into and out of closing engagement with said seat and having a piston portion responsive to the inlet pressure to open said piston valve, said cylinder providing a pressure chamber on the side of said piston valve opposite its working face, a fluid conduit connecting the inlet side of said valve body with said chamber to develop a fluid pressure therein biasing said piston valve to closed position, a tubular extension in sealing engagement with the walls of an extension of said cylinder and carried by said piston valve, said tubular extension communicating with the outlet side of said valve body, a passageway connecting said chamber with the extended end of said tubular extension, a pilot valve for opening said passageway to bleed fluid pressure from said chamber through said tubular extension to the outlet side of said valve body for permitting said valve to move to open position, and a remotely controlled fluid-actuated flow control device comprising a pressure movable balancing plug positioned to variably restrict the passage through said tubular extension for controlling the opening position of said valve.

10. A fluid control valve for a fluid pressure line having an inlet and outlet separated by a bridge portion provided with an opening therein surrounded by a valve seat, a cylinder extending axially and concentrically of said valve seat, a piston valve reciprocable in said cylinder and having a working face movable into and out of closing engagement with said seat and having a piston portion responsive to the inlet pressure to open said piston valve, said cylinder providing a pressure chamber on the side of said piston valve opposite its working face, a fluid conduit connecting the inlet side of said valve body with said chamber to develop a fluid pressure therein biasing said piston valve to closed position, a tubular extension in sealing engagement with the walls of an extension of said cylinder and carried by said piston valve, said tubular extension communicating with the outlet side of said valve body, a passageway connecting said chamber with the extended end of said tubular extension, a pilot valve for opening said passageway to bleed fluid pressure from said chamber through said tubular extension to the outlet side of said valve body for permitting said valve to move to open position, and a fluid pressure responsive flow control device cooperating with said tubular extension and having communication with the intake side of said valve body to thereby variably restrict the passage through said tubular extension for controlling the opening position of said valve.

11. A fluid control valve for a fluid pressure line separated by a bridge portion provided with an opening therein surrounded by a valve seat, a cylinder extending axially and concentrically of said valve seat, a piston valve reciprocable in said cylinder and having a working face movable into and out of closing engagement with said seat and having a piston portion responsive to the inlet pressure to open said piston valve, said cylinder providing a pressure chamber on the side of said piston valve opposite its working face, a fluid conduit connecting the inlet side of said valve body with said chamber to develop a fluid pressure therein biasing said piston valve to closed position, a tubular extension in sealing engagement with the walls of an extension of said cylinder and carried by said valve, said tubular extension communicating with the outlet side of said valve body, a passageway connecting said chamber with the extended end of said tubular extension, a pilot valve for opening said passageway to bleed fluid pressure from said chamber through said tubular extension to the outlet side of said valve body for permitting said valve to move to open position, a fluid connection between the inlet and the pressure chamber beyond said tubular extension, a spring biased piston adjustable in said chamber extension between said tubular extension and said second mentioned fluid conduit, and a flow balancing plug carried by said piston having a beveled end positioned for partial telescoping in said tubular extension to restrict the rate of bleed-off from said chamber for limiting and varying the degree of opening of said valve to maintain a predetermined fluid flow through said valve.

References Cited in the file of this patent

UNITED STATES PATENTS

| | | |
|---|---|---|
| 65,238 | Laing | May 28, 1867 |
| 910,092 | Simons | Jan. 19, 1909 |
| 2,495,901 | Learned | Jan. 31, 1950 |
| 2,619,103 | Davies | Nov. 25, 1952 |
| 2,664,916 | Conley | Jan. 5, 1954 |
| 2,694,544 | Hall | Nov. 16, 1954 |
| 2,699,316 | Mosher | Jan. 11, 1955 |
| 2,794,446 | Swenson | June 4, 1957 |
| 2,851,055 | Mosher | Sept. 9, 1958 |